July 4, 1939.                J. G. INGRES                2,164,991
                        SPEED CONTROLLED SWITCH
                         Filed April 15, 1937

INVENTOR
J. G. Ingres.
BY
Morgan Finnegan & Durham
ATTORNEYS

Patented July 4, 1939

2,164,991

UNITED STATES PATENT OFFICE 2,164,991

SPEED CONTROLLED SWITCH

Jack G. Ingres, Detroit, Mich., assignor to Vaco Products, Inc., Jersey City, N. J., a corporation of Delaware Application April 15, 1937, Serial No. 137,008

1 Claim. (Cl. 200—80)

The present invention relates to a novel and improved speed controlled switch, and more particularly to an improved switch in which the making and breaking of the contacts is controlled by centrifugal action exerted on a conductive fluid.

Objects and advantages of the invention will be set forth in part hereinafter and in part will be obvious herefrom or may be learned by practice with the invention, the same being realized and attained by means of the instrumentalities and combinations pointed out in the appended claim.

The invention consists in the novel parts, constructions, arrangements, combinations and improvements herein shown and described.

The accompanying drawing, referred to herein and constituting a part hereof, illustrates embodiments of the invention, and together with the description, serves to explain the principles of the invention.

The present invention has for its object the provision of a novel and improved speed controlled switch in which there are no complicated parts and which is extremely sensitive to changes in speed, although it is not appreciably disturbed by other factors. Another object is the provision of a novel switch in which the contacts are bridged by means of a conducting liquid maintained within a housing having a partially filled cavity therein. Still another object of the invention is the provision of a switch which is speed controlled and is peculiarly suited for the control of various automotive parts such as automatic gear shifters.

In the illustrated embodiments of the present invention there is provided a rotatable housing within which is a cavity, partially filled with mercury or some other conductive fluid. This cavity is preferably provided with a central portion and outwardly extending portions, these outwardly extending portions allowing the mercury to raise itself to a higher level by centrifugal force. These outwardly extending portions are of sufficient volume so that when the device is rotating at a sufficiently high speed the mercury may flow away from the central portion. A plurality of contacts are provided which are adapted to be simultaneously immersed in the mercury, either while the device is at rest or while it is rotating at more than a predetermined speed, and means are also provided for connecting these contacts with a stationary member so that circuit connections may be made with some external object. Preferably, the central portion of the device is provided with a downwardly extending contact which is slightly immersed in the mercury so that as the housing is rotated at a relatively low speed, the mercury is impelled away from this contact to break the circuit and thus cause the operation of some speed controlled apparatus. Preferably, although not necessarily, the mercury containing cavity is sealed so as to reduce the oxidation and evaporation of the mercury as the circuit is made and broken. If desired, both contact members may be carried on a central member and in this case the circuit is broken when the speed of rotation exceeds a predetermined limit.

While in many respects the switch of the present invention may be applied to many different uses, it finds a particular application in connection with the automatic control of gear shifting devices for automotive vehicles, and when so used it is driven proportionally to the speed of the vehicle by the propeller shaft, and controls the action of the gear shifting valving so that the gear ratio is to some extent determined by the speed at which the vehicle is moving.

Figure 1:
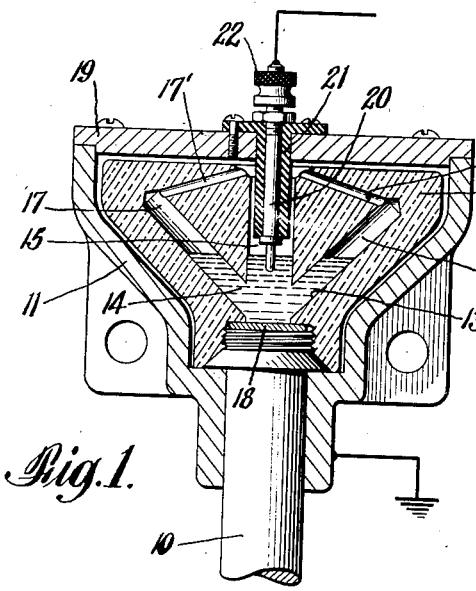
Figure 1 is a vertical section showing an illustrative embodiment of the present invention with the switch mechanism at rest.
Figure 2:
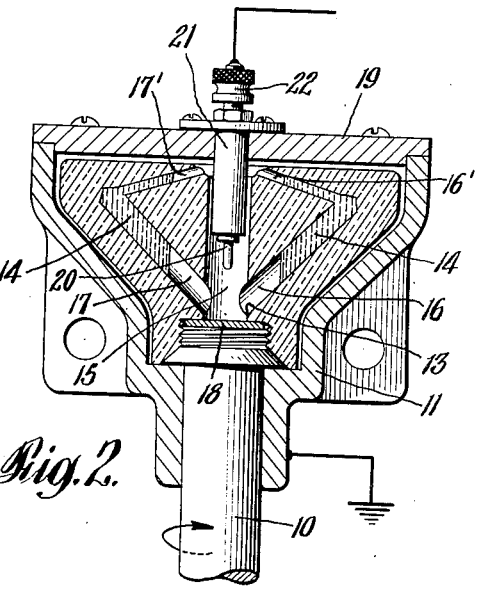
Figure 2 is a similar view of the embodiment shown in Figure 1, but with the switch mechanism rotating at a relatively high speed.

Referring now in detail to the illustrative embodiment of the invention as shown by Figures 1 and 2 of the accompanying drawing, the embodiment is adapted to be driven by the propeller shaft of the automotive vehicle and the device may be positioned immediately behind or within the transmission box of the vehicle, and is adapted to break the circuit upon the vehicle reaching a relatively slow speed.

As embodied, there is provided a vertically extending shaft 10 to be driven by the vehicle, which shaft is journalled in the stationary housing 11. At the top of shaft 10 is provided a housing 12 of insulating material, such as glass or Bakelite, provided with a cavity 13 in which is contained a quantity of mercury or other conducting liquid 14. This cavity is provided with a centrally located portion 15 and with outwardly extending portions 16 and 17, which are inclined upwardly and outwardly so that the mercury tends to return by gravity to and remain in the central portion of the housing. The upper portion of the shaft 10 is provided with a contact piece 18 which is normally in contact with the mercury while the housing is at rest and forms one of the contacts, which is generally the grounded contact, communicating with the grounded stationary housing 11 through the shaft journal.

Mounted upon the upper portion of the housing 11, or as shown upon the removable cover plate 19, and projecting downwardly therefrom is a contact 20 which extends down and slightly below the surface of the mercury, and is insulated from the housing 11 by means of the insulating material 21. A binding post 22 provides a circuit connection with this central contact.

While the vehicle is at rest, the circuit is closed between the contact 18 and contact 20 by the mercury, while as soon as the vehicle has reached a very low speed corresponding to only about 100 R. P. M. of the rotor, centrifugal force overcomes gravity and the mercury begins to move away from the central portion of the cavity and into the outwardly extending portions 16, 17 and then 16', 17', thereby causing the circuit to be broken. When a slightly faster speed of rotation has been attained, the mercury assumes the position shown in Figure 2, where it remains in open circuit position until the speed has been reduced below the critical value. The contacts can be made to open and close at other speeds by varying the upward angle of parts 16 and 17 and the amount of mercury within the housing 12.

Figure 3:
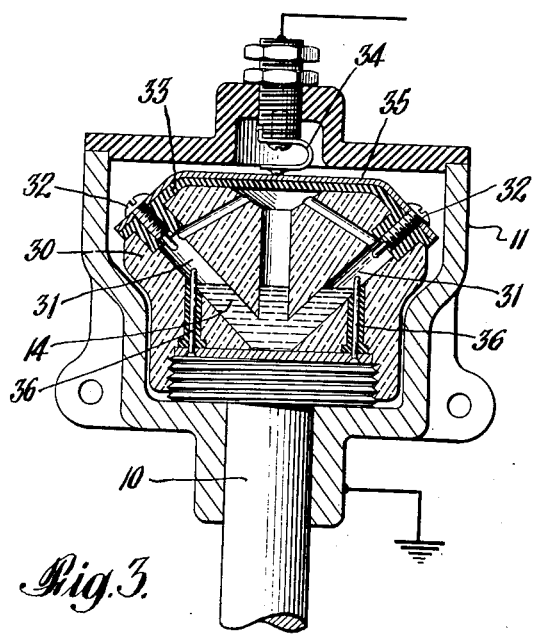
Figure 3 is a vertical sectional view of a modified embodiment of the present invention, showing the mechanism at rest.

Figure 3 illustrates a modified embodiment of the invention in which the cavity is air tight, and in which the contacts are adapted to be bridged by an increased speed of rotation. As there embodied, the rotatable housing 30 is formed of insulating material, while the outer ends of the outwardly and upwardly extending passageways 31 are provided with contacts 32 mounted on the housing 30 by means of the insulating member 33, and these contacts 32 are interconnected with each other and with the stationary connecting member 34 by means of the metal strip 35. When the member 30 is rotating sufficiently fast, the mercury is impelled outwardly by centrifugal force so as to bridge the gap between the contacts 32 and the contact members 36.

Figure 4:
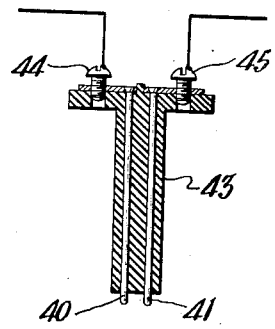
Figure 4 is a fragmentary vertical sectional view of a further modification of certain parts which may be used in connection with the remainder of the device as shown in Figure 1.

Figure 4 illustrates a further embodiment of the invention particularly adapted for opening a circuit upon a certain speed of rotation being exceeded. As embodied, there are provided two contacts 40, 41 extending downwardly and beyond the lower end of an insulating member 43, these contacts being provided with separate terminals 44 and 45 to which the circuit connections may be made. This pair of contacts may thus replace the single central contact 20 shown in Figures 1 and 2, and as the mercury is impelled away from the central portion of the rotating housing, the circuit is broken at approximately the same time on both contacts 40 and 41.

The invention in its broader aspects is not limited to the specific mechanisms shown and described but departures may be made therefrom within the scope of the accompanying claim without departing from the principles of the invention and without sacrificing its chief advantages.

What I claim is:

In a speed controlled switch, the combination of a rotatable housing having a central cavity therein partially filled with mercury, said cavity connecting with outwardly and upwardly extending passageways, inwardly and upwardly directed passageways connected near the outer ends of the first passageways, and a plurality of contacts adapted to be in contact with the mercury at certain speeds of rotation and to be out of contact with the mercury at other speeds of rotation.

JACK G. INGRES.